United States Patent
Khodl et al.

(10) Patent No.: US 11,492,200 B2
(45) Date of Patent: Nov. 8, 2022

(54) METHOD AND APPARATUS FOR CONTROLLING FLOW OF OBJECTS IN A MATERIAL HANDLING SYSTEM

(71) Applicant: Dematic Corp., Grand Rapids, MI (US)

(72) Inventors: Michael S. Khodl, Ada, MI (US); Tim Post, Grand Rapids, MI (US)

(73) Assignee: Dematic Corp., Grand Rapids, MI (US)

( * ) Notice: Subject to any disclaimer, the term of this patent is extended or adjusted under 35 U.S.C. 154(b) by 335 days.

(21) Appl. No.: 16/575,803

(22) Filed: Sep. 19, 2019

(65) Prior Publication Data

US 2020/0095064 A1 Mar. 26, 2020

Related U.S. Application Data

(60) Provisional application No. 62/734,005, filed on Sep. 20, 2018.

(51) Int. Cl.
*B65G 1/137* (2006.01)
*G05B 15/02* (2006.01)

(52) U.S. Cl.
CPC ........... *B65G 1/1373* (2013.01); *G05B 15/02* (2013.01); *B65G 2203/0216* (2013.01); *B65G 2203/044* (2013.01)

(58) Field of Classification Search
CPC combination set(s) only.
See application file for complete search history.

(56) References Cited

U.S. PATENT DOCUMENTS 9,171,278 B1 * 10/2015 Kong .................... B65G 1/137
9,315,323 B2 4/2016 Schubilske
9,555,967 B2 1/2017 Stevens
9,604,781 B2 3/2017 Stevens et al.
10,301,113 B2 5/2019 Stevens et al.
(Continued)

FOREIGN PATENT DOCUMENTS

| DE | 102015219660 A1 | 4/2017 |
|---|---|---|
| WO | 2007080177 A1 | 7/2007 |
| WO | 2016022546 A1 | 2/2016 |

OTHER PUBLICATIONS

"Palletizers and Depalletizers" by Honeywell Intellgrated, Published 2017.

(Continued)

*Primary Examiner* — Kyle O Logan
(74) *Attorney, Agent, or Firm* — Gardner, Linn, Burkhart & Ondersma LLP

(57) ABSTRACT

A material handling system having object handling and transportation devices and method of receiving objects into a warehouse having a material handling system includes scanning a machine readable code of an incoming load forming at least a portion of an order and comparing the machine readable code with an order file listing objects on the incoming load. For each object on the load, object data including a 3D image and product code of the object removed from the incoming load is received with an image capture station and reconciled with the order file. Each object is identified by comparing the 3D image of the object captured with the image capture station with the 3D images in the database. The material handling system is controlled as a function of the identity of the objects being handled and transported by the material handling system.

28 Claims, 5 Drawing Sheets

(56) References Cited

U.S. PATENT DOCUMENTS

| | | | |
|---|---|---|---|
| 2010/0191367 A1 | 7/2010 | Grundmann et al. | |
| 2012/0224743 A1 | 9/2012 | Rodriguez et al. | |
| 2013/0282165 A1* | 10/2013 | Pankratov | B65G 57/09 700/217 |
| 2015/0312426 A1* | 10/2015 | Schoner | G06F 16/50 235/375 |
| 2015/0347801 A1 | 12/2015 | Svetal | |
| 2015/0363625 A1 | 12/2015 | Wu et al. | |
| 2017/0024896 A1* | 1/2017 | Houghton | H04N 13/243 |
| 2017/0283171 A1* | 10/2017 | High | B66F 9/0755 |
| 2018/0068139 A1 | 3/2018 | Aalund et al. | |
| 2018/0114415 A1 | 4/2018 | Mattingly et al. | |
| 2020/0039747 A1* | 2/2020 | Ahmann | B65G 1/1375 |

OTHER PUBLICATIONS

International Search Report and Written Opinion of the International Searching Authority from corresponding Patent Cooperation Treaty (PCT) Application No. PCT/IB2019/057939, indicated completed on Nov. 23, 2019.

Commonly assigned co-pending U.S. Appl. No. 16/526,004, filed Jul. 30, 2019.

Commonly assigned co-pending U.S. Appl. No. 16/526,166, filed Jul. 30, 2019.

* cited by examiner

METHOD AND APPARATUS FOR CONTROLLING FLOW OF OBJECTS IN A MATERIAL HANDLING SYSTEM

CROSS REFERENCE TO RELATED APPLICATION

The present application claims priority of U.S. provisional application Ser. No. 62/734,005 filed Sep. 20, 2018 by Dematic Corp., which is hereby incorporated herein by reference in its entirety.

FIELD OF THE INVENTION

The present invention is directed to a material handling system and a method of controlling a material handling system, in particular a material handling system that handles cases, pallet loads of cases, mixed cases of items, envelopes or bags frequently used in e-commerce order fulfillment, and the like.

BACKGROUND OF THE INVENTION

Objects, such as cases, are assigned a uniform product code (UPC) and bear a machine readable indicia, such as a bar code or QR code, that is intended to allow the identity of the product in the case to be machine identified. There are several difficulties with such scheme. One difficulty is that the machine readable code is often on the bottom surface of the case where it is difficult to be read. Another difficulty is that more than one distinct product may be covered by the same UPC. For example, small breweries and bottlers may market several distinct beverages under the same UPC. Also, even large breweries and bottlers may market the same beverage but under several distinct packaging or trade dress. For example, it is known that the same beverage may be marketed to different cities using packaging that is specific for the sports team of that city. Also, it is known to vary packaging according to a particular holiday season. Since the beverage is the same regardless of the packaging, the same UPC code is applied.

These difficulties not only increase the possibility of error in order fulfillment, they increase the need for manual processing. This reduces the opportunity for automation of the process.

SUMMARY OF THE INVENTION

In order to overcome the above difficulties, it is known to have a distributor apply their own label to the case. The label is applied in a location on the case that is certain to be accessible to automated scanning equipment. Also, labels are created that distinguish between different trade-dress for the same product. In this manner there is a significantly reduced risk that the wrong product will be included in the order. However, such solution is not without its own drawback.

One drawback is that it requires a human operator to examine the case or other object to correctly identify it in order to ensure that the correct label is applied to it. This reduces the opportunity for providing a fully or primarily automated system. Also, as cases become more decorative and serve as a marketing tool for the manufacturer, the manufacturers have objected to the material handling system operator applying labels over the trade-dress.

The present invention provides a fully or partially automated inbound incoming/receiving function as well as a fully or partially automated material handling system and method of operation that is capable of handling cases of product that may have a variety of different product or trade-dresses identified by a common machine readable UPC code. Also, the invention is capable of identifying each unique product/trade-dress combination even if the machine readable UPC code is difficult to access.

The present invention allows reliable operation of a material handling system without the requirement of the operator applying machine readable UPC code labels to the objects being handled by the system. While aspects of the invention are most useful with the handling of cases of objects and other aspects of the invention are most useful with the handling of pallets or other load supports loaded with cases, bags or pouches as objects, other applications may be found.

The present invention provides a fully automated inbound receiving module which is capable of providing an active database representing objects that are received into that system. The system is capable of operation independent of object data that is provided by the manufacturers, which is often incorrect or irrelevant.

A material handling system and method of controlling a material handling system, according to an aspect of the invention, includes the material handling system having object handling and transportation devices. Object data for a plurality of objects is stored in a database. The object data includes three-dimensional (3D) images of the objects. An image capture station captures a 3D image of an object being handled and transported by the material handling system. The object is identified by comparing the 3D image of the object captured with the image capture station with the 3D images in the database. The material handling system is controlled as a function of the identity of the objects being handled and transported by the material handling system.

The database may be constructed with images captured with the image capture station. The material handling system may include a teaching system that captures 3D images of objects and the database may be constructed with images captured with the teaching system. The object data may further include a uniform product code (UPC) of the object and the method may include capturing any UPC of the object being handled and transported by the material handling system with the image capture station and including the captured UPC with the object data for that object. The identifying of an object may include comparing the captured UPC of an object with the UPC in the object data of the database unless the UPC cannot be captured with the image capture station or more than one object shares a common UPC with another object.

The 3D image of an object may include a point cloud of the object. The object data may include volumetric data of the object and/or weight of the object. The material handling system may be in an order fulfillment facility and the database may include object data substantially only of objects currently at the order fulfillment facility, such as by deleting object data of an object when it is no longer at the order fulfillment facility. Object data may be saved to a public network and may be accessed at the public network from material handling systems of other order fulfillment facilities.

Control of the material handling system may include confirming quantity of objects picked by a picker, which may be a human or a robotic picker. Identity of objects being sent to a pack-out operation may be validated. The pack-out operation may be an automated palletizer and the material handling system controlled in a manner that includes comparing weight of objects on a pallet with the weight of the filled pallet.

The objects being handled and transported by the material handling system may include pallet loads of objects and control of the material handling system may include auditing the pallet load, wherein the auditing the pallet load includes capturing object data of the pallet load as pallet load data, de-palletizing the pallet load, identifying objects retrieved from the pallet load and comparing identity of the objects retrieved from the pallet with pallet load data to construct updated pallet load data. Auditing an incoming order may be carried out by comparing pallet load data with electronic incoming order data.

A material handling system having object handling and transportation devices and method of receiving objects into a warehouse having a material handling system according to an aspect of the invention, includes scanning a machine readable code of an incoming load forming at least a portion of an order and comparing the machine readable code with an order file listing objects on the incoming load. For each object on the load, object data including a 3D image and uniform product code (UPC) of the object removed from the incoming load is received with an image capture station and reconciled with the order file and used to update the object data to updated object data.

The updated object data may be added to a database. The material handling system may be controlled as a function of the identity of the objects removed from the incoming load and/or in the database. All objects captured with the image capture station may be compared with the order file in order to confirm the accuracy of the objects received. The order file may be an advanced shipping notification. The objects may be unloaded from the load using an automated process. All steps in the receiving process may be performed using automated processes. Object data may be deleted from the database when the type of object is no longer at the warehouse. Data may be exchanged between the database and a public network.

A material handling system having object handling and transportation devices and method of controlling a material handling system, according to an aspect of the invention, includes storing object data for a plurality of objects in a database. The object data includes three-dimensional (3D) images and UPC codes of the objects. Attempt is made to capture a 3D image of an object and a UPC code with an image capture station of the object being handled and transported by the material handling system. An object is identified by comparing any 3D image and any UPC code of the object captured with the image capture station with the 3D images and UPC codes in the database. The material handling system is controlled as a function of the image and UPC code of objects being handled and transported by the material handling system if the 3D image and UPC code can both be captured and are uniquely in agreement with each other. The material handling system is controlled as a function of the 3D image of objects being handled and transported by the material handling system if the UPC code cannot be captured or does not uniquely agree with the image of the object.

These and other objects, advantages and features of this invention will become apparent upon review of the following specification in conjunction with the drawings.

DETAILED DESCRIPTION OF THE PREFERRED EMBODIMENT

Figure 1:
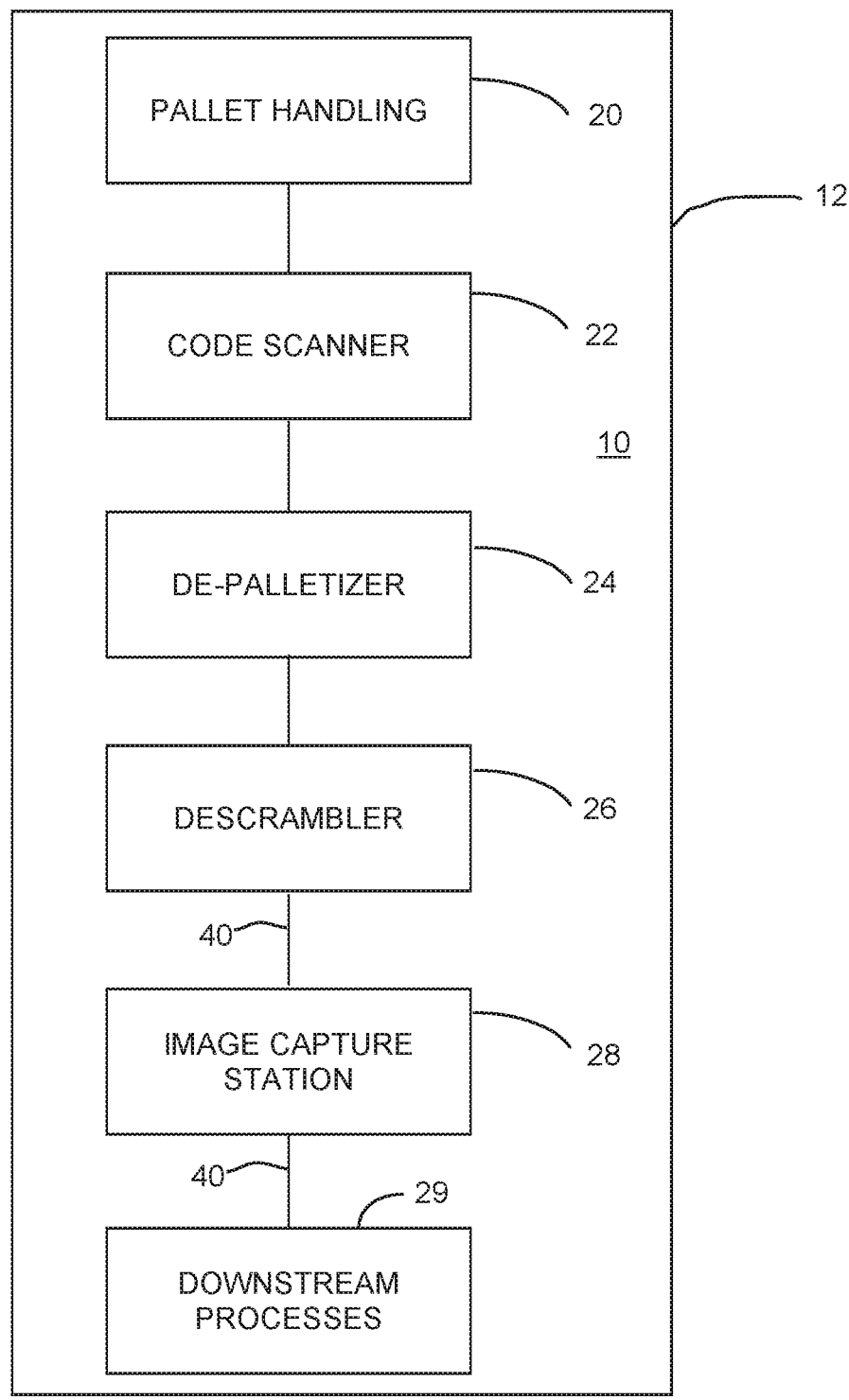
FIG. 1 is a block diagram of an automated object incoming/receiving material handling system and method of operation according to an embodiment of the invention.

Referring now to the drawings and the illustrative embodiments depicted therein, a material handling system 10 for use in a warehouse 12 is shown in FIG. 1. Warehouse 12 can be an e-commerce order fulfillment warehouse, a cross-docking warehouse, a split case order fulfillment center, or other known types of material handling facility. Material handling system 10 includes an automated incoming/receiving system that includes a pallet handling device 20 which may be an integral part of the system, such as an overhead monorail, or robotic pallet truck or manual pallet truck. Pallet handling device 20 retrieves a pallet from incoming storage or dock (not shown) and moves the pallet past a code scanner 22 which reads a barcode or other machine readable code on the pallet which identifies the content of the pallet. Pallets may be covered with shrink-wrap, such that no image of the contents can likely be captured. An automated de-palletizer 24 unloads the pallet. If an entire layer of the pallet is removed by de-palletizer 24 a descrambler 26 separates and singulates the objects removed from the pallet.

Figure 5:
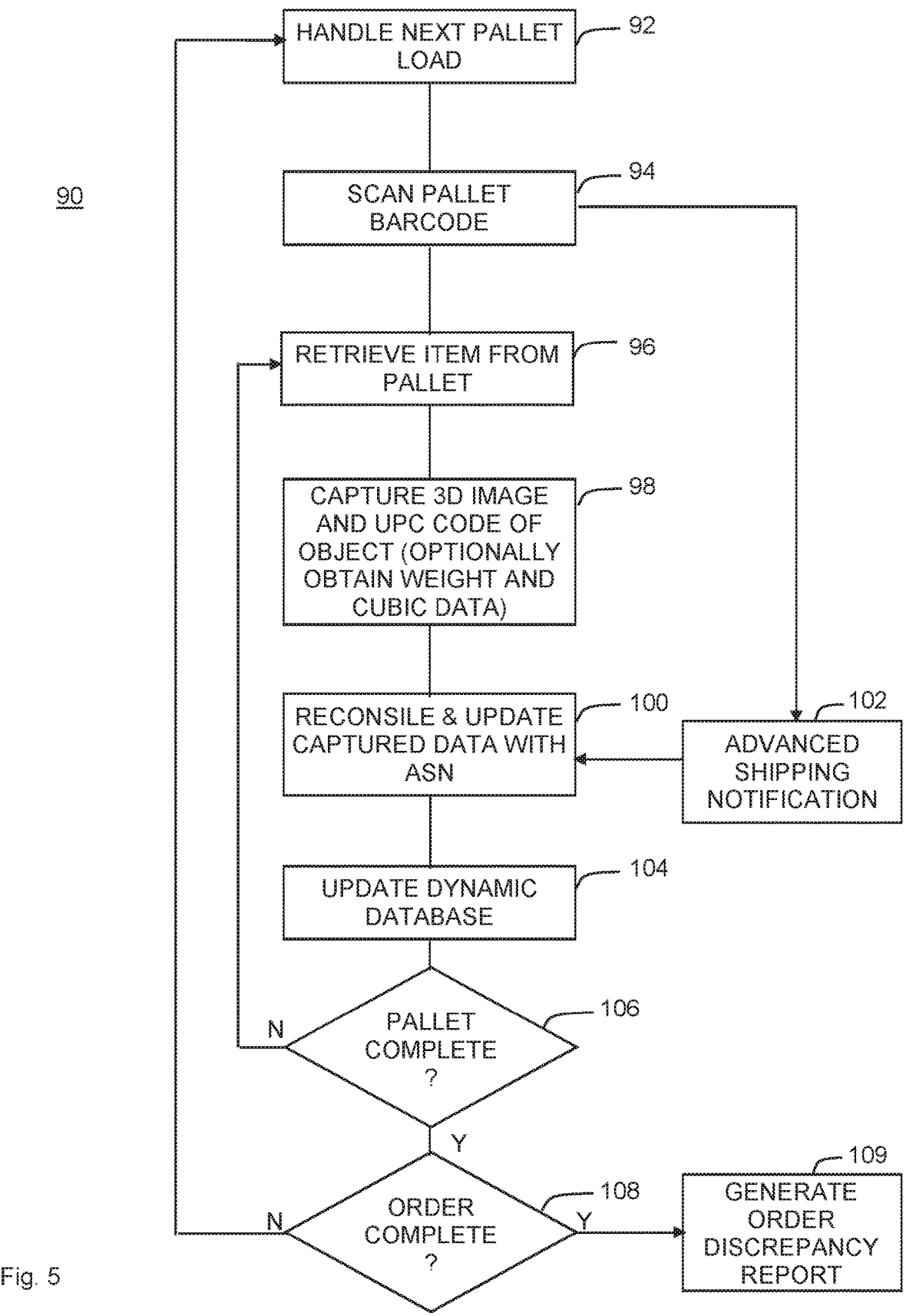
FIG. 5 is a process flow diagram of a method of controlling the material handling system in FIG. 1.

A source of manual labor in order fulfillment is confirming that material supplied for an order is in agreement with the order file for those materials. This is especially time consuming and creates labor resource shortfalls when multiple pallet loads of material are incoming. An automated incoming/receiving method 90 for controlling a material handling system is illustrated in FIG. 5. Each order of incoming objects, such as from manufactures, or the like, is preceded with an Advanced Shipping Notification (ASN) which is typically received electronically such as over the internet and provides information about the purported content of each pallet and a barcode for the pallet. While the ASN may include information about the weight and volumetric information (length, width, height, and volume) of objects that is supplied by the manufacturer, such information is considered to be unreliable, and therefore not relied upon by incoming/receiving method 90 or material handling control method 70.

Method 90 begins by pallet handling system 20 retrieving the next loaded pallet to be processed at 92. Code scanner 22 reads the bar code, or other machine readable code, on the pallet at 94 which is applied to the ASN at 102 to retrieve content of the pallet. The pallet is unloaded at 96 either manually, robotically or using de-palletizer 24 and if an entire level of the pallet is removed then the objects go through a descrambler 26. For each object removed from the pallet, image capture station 28 captures a 3D point cloud image of the object and any UPC code that can be read. Optionally, image capture station 28 may obtain weight of the object with a scale and obtain volumetric information (length, width, height, cubic volume) to be used with a down-stream processes 29 such as selecting package size for pack-out or for use in determining a pallet build. At 100, the data obtained at 98 is reconciled with pallet content data obtained from the ASN at 102, such as being consistent with the identity of an object assigned to the pallet, to build a dynamic database 104. Because database 104 is built from received objects, it may include just objects being handled by facility 12. Also, since the image of the object is captured along with the UPC code, dynamic database at 104 distinguishes objects that share a common UPC code but have different content or trade dress. Also, dynamic database 104 is built from data obtained by image capture station 28 such that database 104 is not reliant on manufacturer data.

It is determined at 106 whether all of the objects that are supposed to be on the pallet have been processed. If not, the process returns to 96 for retrieval of the next object. If it is determined at 106 that the pallet has been fully processed it is then determined at 108 if the order has been fully processed or completed. If the order has not been fully processed, pallet handler 20 retrieves the next pallet in the order at 92 and the bar code on the pallet is scanned at 94. If it is determined at 108 that the order is complete, then a final comparison of the off-loaded objects with the advanced shipping notification is carried out at 109 and any discrepancies reported. The report can be sent to the manufacturer or other source of the objects. Method 90 greatly advances the objective of automating the order fulfillment process by allowing automating of the order auditing function.

Figure 2:
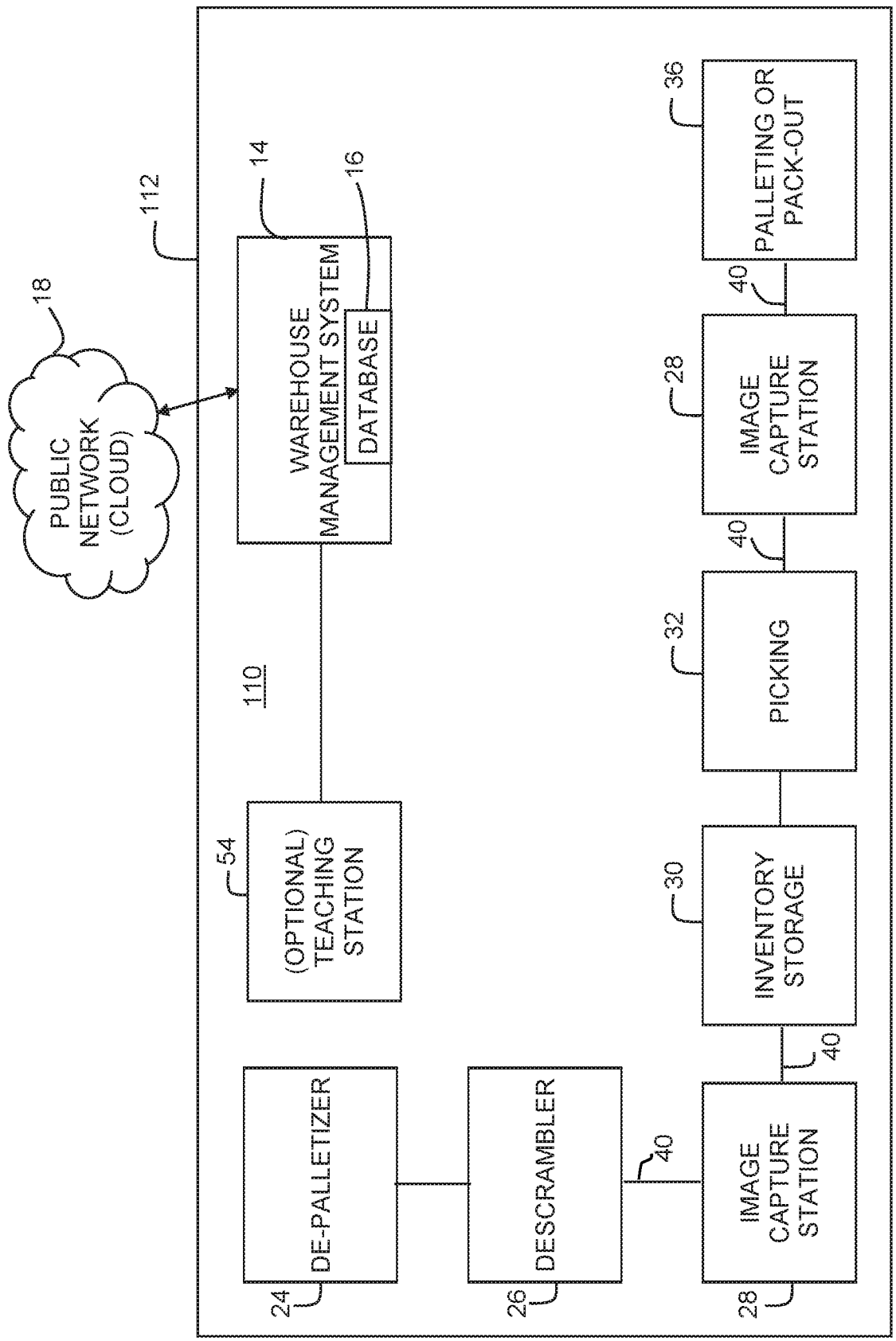
FIG. 2 is a block diagram of an order fulfillment material handling system and method of operation according to an embodiment of the invention.

A material handling system 110 for use in a warehouse 112 is shown in FIG. 2. The individual objects, which may be cases of items such as beer, non-alcoholic beverages, food, or cases of mixed-product are de-palletized with a de-palletizer 24 in which an entire layer of objects are removed at a time and descrambled into individual objects with a descrambler 26 and conveyed with a conveyor 40 through a three-dimensional (3D) image capture station 28, which is shown in more detail in FIG. 3. Image capture station 28 captures a 3D image of the trade dress of the case or other object and any UPC code that it is able to find. The 3D image of the object and UPC code is applied to database 16 by warehouse management system 14 in order to try to identify the object as will be explained in more detail below.

Once the object is identified, it is placed into inventory storage 30 which remembers the location of the object so that the object can be retrieved to fill a customer's order, or the like. Inventory storage may be a manually accessible area that can be picked using pick-to-voice or pick-to-light techniques as are known in the art. Alternately, inventory storage 30 may be an automated warehouse such as an automated storage and retrieval system, multi-shuttle based system, uni-load system, or the like.

In order to fill an order, objects are retrieved from inventory storage 30 under direction of warehouse management system 14. For example, objects such as cases may be manually retrieved from inventory storage 30 by an operator who is instructed to pick a certain number of objects to fill the order. Alternatively, if inventory storage 30 is an automated storage and retrieval system it automatically retrieves the objects under instructions from warehouse management system 14. The retrieved objects are transported with a conveyor 40 through another 3D image capture station 28 in order to determine if a correct number of the proper objects have been picked at 32. This is accomplished by 3D image capture station 28 applying any captured image and/or UPC code to database 16 which then retrieves object data for the object and the warehouse management system 14 determines if the correct count has been obtained of the correct object for the order.

The objects are then conveyed by conveyor 40 to a palletizing or other pack-out function 36 for shipping.

Object data in database 16 for each object may include not only the identity of the object but also physical data such as weight and volumetric data, namely length, width, and height. The weight and volumetric data of the object can be used both in pallet planning for planning distribution of objects on the pallet and in validation of the pallet build by comparing pallet weight to weight of the objects that are planned to be on the pallet.

Figure 3:
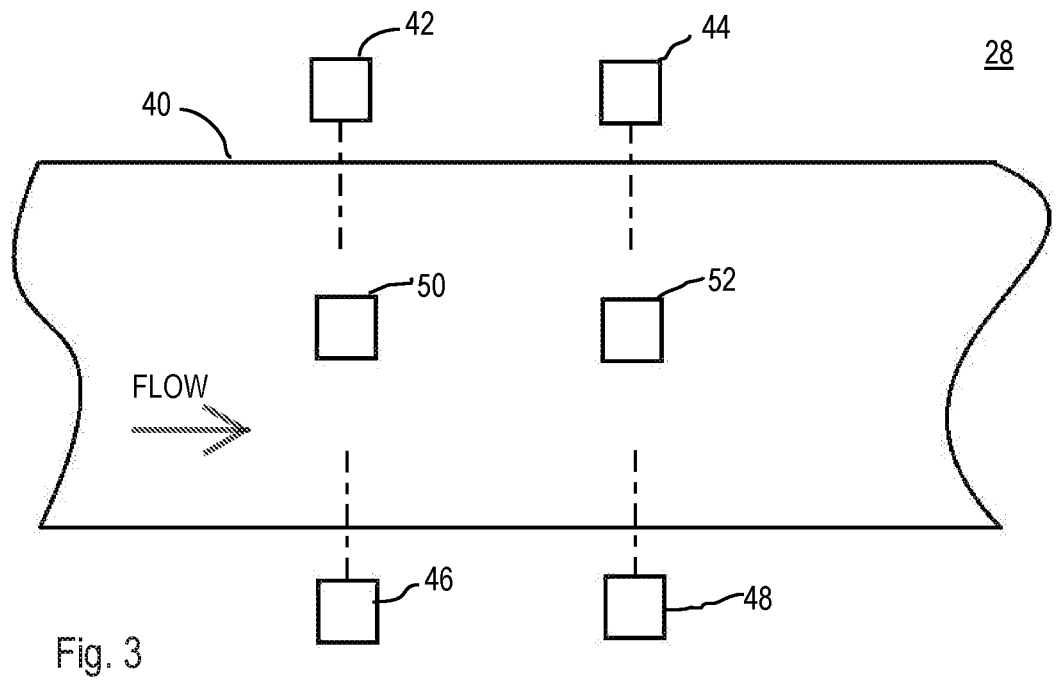
FIG. 3 is a block diagram of an image capture station.

Three-dimensional image capture station 28 is illustrated in more detail in FIG. 3. Conveyor 40 conveys objects past three banks of two-dimensional (2D) cameras and code scanners in order to capture images of objects from three different views and a UPC code if placed on the top or either side of the object. The cameras include one or more horizontal left cameras 42 and left code scanners 44 at a left side of conveyor 40 in the direction of movement of the conveyor. While only one camera is shown, a bank of redundant cameras may be provided to increase the opportunity to capture an accurate image of the left side of the object. In a similar fashion, a horizontal right 2D camera 46 and right code scanner 48 are provided on the right side of conveyor travel. A vertical 2D camera 50 and vertical code scanner 52 are provided looking vertically downward to capture the image of the top of the object and any UPC code on the top of the object. Cameras 42, 46, and/or 50 can alternatively be 3D cameras. Three-dimensional image capture station 28 is capable of electronically "stitching together" the three planar images from cameras 42, 46, and 50 into a 3D point cloud of each object which is then stored with object data in database 16. A 3D point cloud is a set of data points in space of the external surfaces of the object.

Figure 4:
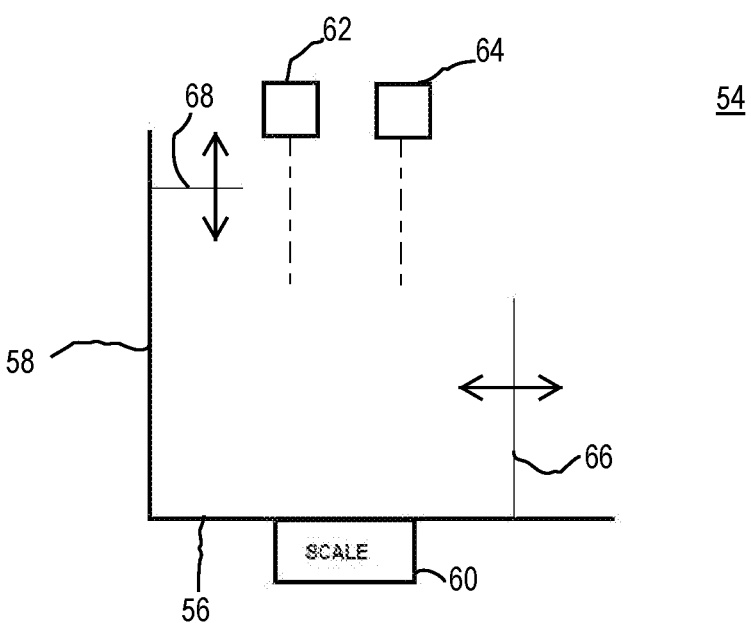
FIG. 4 is a block diagram of an optional teaching station.

Material handling system 110 may include a teaching station 54 for initially obtaining the object data of an object and storing the object data in data base 16. Teaching station 54 (FIG. 4) includes a bottom surface 56, side surface 58, and a scale 60 to obtain weight of an object supported by bottom surface 56. A 2D or 3D camera 62 views an object supported by bottom surface 56 and a code scanner 64 attempts to read a UPC code on a side of an object supported by bottom surface 56. A top slide 66 and side slide 58 are moved into contact with the objects top and side surfaces to make measurements of two dimensions of volumetric data. An operator or robot rotates the object into three orientations to obtain object data of three surfaces, UPC codes, volumetric data, and weight data relative to the three orientations. A 3D point cloud is created of the object. If additional data is desired, the object can be moved to more than three different orientations. The captured data (image, point cloud, UPC code, cubic or volumetric data, and weight) is stored in database 16 along with identity of the object.

In the illustrated embodiment, object data is maintained in database 16 only for as long as the object type is present in warehouse 12. This reduces the amount of data in database 16 which increases access speed. This, for example, increases the utility of material handling system 10 for supplying smaller stores with small and unique inventories, such as stores that carry ethnic food targeted for the customers surrounding the stores being supplied by the facility. The object data being deleted may be transferred or stored in a public network, or cloud storage, 18 where it can be accessed by other related facilities. In this manner, not every facility requires a teaching station. Also, a teaching station may be optional because automated incoming/receiving method 90 may be used to identify all of the objects that are planned to be on the pallet. In this manner, as objects are de-palletized at 24, information about each object that is supposed to be on the pallet (as provided by the ASN) is compared with each object being de-palletized as obtained by the first image capture station 28 in order to build object data for that object which can then be stored in database 16. The obtained object data can be uploaded to public network 18.

Figure 6:
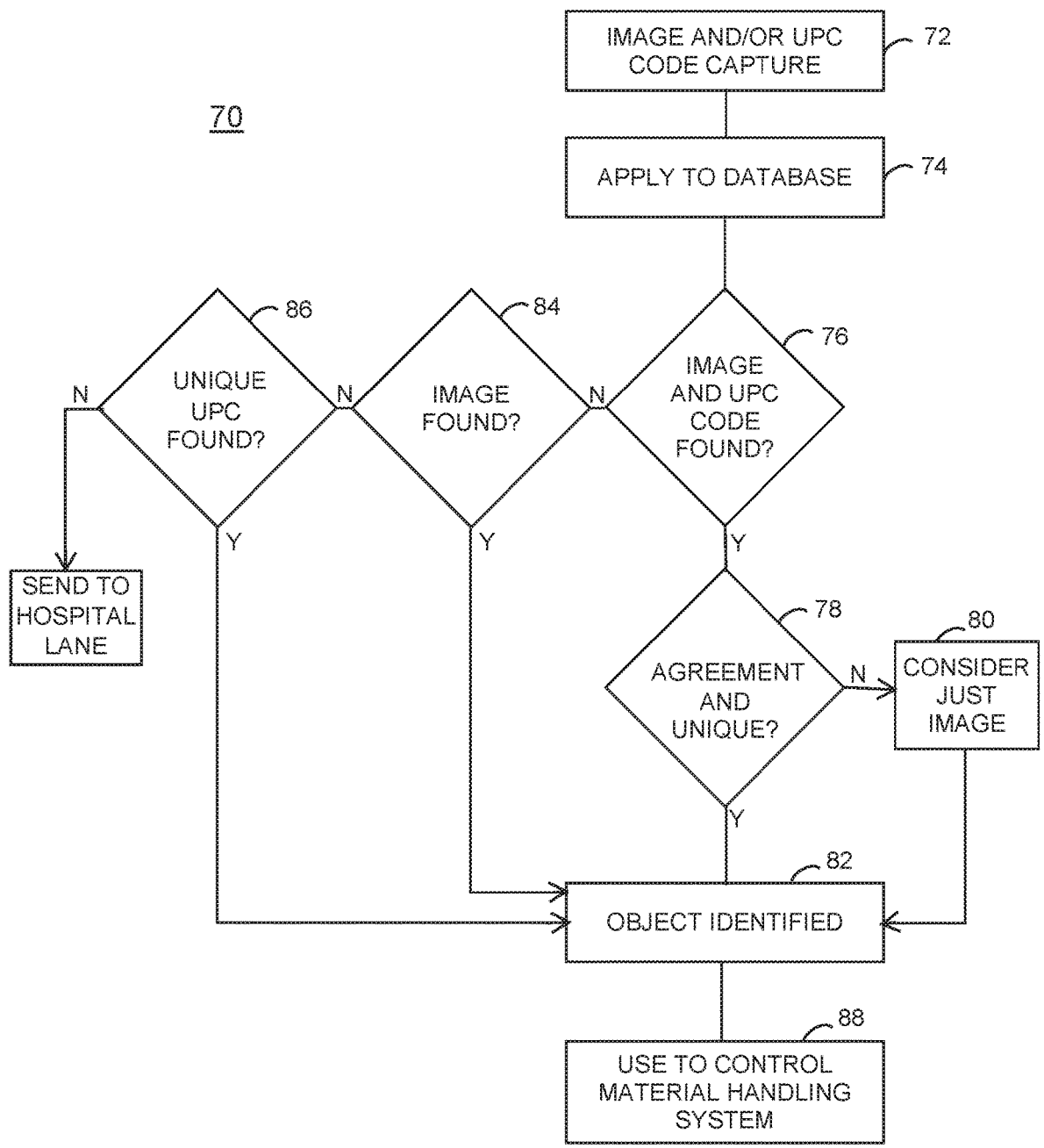
FIG. 6 is a process flow diagram of a method of controlling the material handling system in FIG. 2.

A process flow diagram of a method 70 of controlling material handling system 110 is illustrated in FIG. 6. When image capture station 28 captures an image and/or a UPC code of the object being handled, the captured image and/or code is applied to database 16 at 74. A determination is made at 76 if an image and a UPC code is located for the handled object. If so, it is determined at 78 whether the image and UPC code are in agreement in identifying a unique object. If so, it is concluded at 82 that the object has been identified. If it is determined at 76 that only an image of the scanned item was located by the image capture station 28 then the image is applied to database 16 at 84 to determine is a match is found in the database. If so, then it is concluded at 82 that the object is identified. If it is determined at 76 and 84 that no image was found by image capture station 28, then it is determined at 86 whether a UPC code was captured and is unique, i.e. is not assigned to more than one object in database 16. If so, then it is concluded at 82 that the object has been identified. If it is determined at 86 that no unique bar code was located in database 16 then the object is sent to a hospital lane because it cannot be identified.

If it is determined at 78 that there is no agreement in database 16 between the captured image and the UPC bar code or that more than one object with that UPC barcode is located then it is concluded at 80 that the object is to be identified by the image alone. The object is then identified at 82. With the object identified at 82, material handling system 10 can be controlled such as by placing the object into inventory storage 30 or confirming that a proper number of objects have been picked at 32 and can be sent to palletizing at 36.

While the foregoing description describes several embodiments of the present invention, it will be understood by those skilled in the art that variations and modifications to these embodiments may be made without departing from the spirit and scope of the invention, as defined in the claims below. The present invention encompasses all combinations of various embodiments or aspects of the invention described herein. It is understood that any and all embodiments of the present invention may be taken in conjunction with any other embodiment to describe additional embodiments of the present invention. Furthermore, any elements of an embodiment may be combined with any and all other elements of any of the embodiments to describe additional embodiments.

The embodiments of the invention in which an exclusive property or privilege is claimed are defined as follows:

1. A method of controlling a material handling system, the material handling system comprising object handling and transportation devices, said method comprising:
   storing object data for a plurality of database objects in a database, the object data comprising three-dimensional (3D) images of the database objects;
   capturing object data of an inbound load of a plurality of objects as inbound load data;
   storing the inbound load data in the database;
   unloading the inbound load, comprising handling and transporting individual objects from the inbound load to an image capture station of the material handling system;
   capturing a 3D image of a handled object from the inbound load with the image capture station;
   identifying the handled object by comparing the 3D image of the handled object captured with the image capture station with the 3D images of database objects in the database;
   comparing the unloaded objects with the inbound load data to confirm accuracy of the objects received; and
   controlling devices of the material handling system downstream of the image capture station as a function of the identity of the handled objects being handled and transported by the material handling system for storage and/or order fulfilment processes for the handled objects.

2. The method as claimed in claim 1 including constructing said database with images captured with said image capture station.

3. The method as claimed in claim 1, wherein the material handling system includes a teaching system and said method further comprises capturing 3D images of objects with the teaching system and constructing said database with images captured with the teaching system.

4. The method as claimed in claim 1, wherein the object data of an object further comprises a uniform product code (UPC) of that object.

5. The method as claimed in claim 4, wherein said capturing includes attempting to capture any UPC of the handled object with the image capture station and including the captured uniform product code with the object data for that handled object.

6. The method as claimed in claim 5, wherein said identifying the handled object includes comparing the captured UPC of that handled object with a UPC in the object data of the database unless a UPC cannot be captured with the image capture station or more than one database object shares a common UPC with the captured UPC of the handled object, wherein if the captured UPC is common to one or more database object and the captured 3D image of the handled object does not match any object data of the database object having the common UPC, updating the database to include the captured 3D image data of the handled object with the object data corresponding to the common UPC.

7. The method as claimed in claim 1, wherein the 3D image of an object comprises a point cloud of the object.

8. The method as claimed in claim 1, wherein the object data includes at least one chosen from volumetric data of the object and weight of the object.

9. The method as claimed in claim 1, wherein the material handling system is in an order fulfillment facility and wherein the data base includes object data substantially only of objects currently at the order fulfillment facility.

10. The method as claimed in claim 9 including deleting object data of an object when that object is no longer at the order fulfillment facility.

11. The method as claimed in claim 9 including saving object data to a public network and accessing object data at the public network from material handling systems of other order fulfillment facilities.

12. The method as claimed in claim 1, wherein said controlling the material handling system includes confirming quantity of objects picked by a picker.

13. The method as claimed in claim 1, wherein said controlling the material handling system includes validating identity of objects being sent to a pack-out operation.

14. The method as claimed in claim 13, wherein the pack-out operation comprises an automated palletizer and wherein said controlling the material handling system includes comparing the weight of individual objects planned to be placed on a pallet with the weight of the filled pallet.

15. The method as claimed in claim 1, wherein the inbound load of a plurality of handled objects comprises a pallet load of objects and the inbound load data comprises inbound pallet load data, and wherein said unloading comprises de-palletizing the individual objects of the pallet load with an automated depalletizer, and further comprising updating the pallet load data by comparing identity of the objects retrieved from the pallet with the pallet load data to construct updated pallet load data of the remaining objects on the pallet.

16. The method as claimed in claim 15, further comprising auditing an incoming order by comparing pallet load data with advanced electronic incoming order data.

17. A method of receiving objects into a warehouse having a material handling system, the material handling system comprising object handling and transportation devices, said method comprising;
scanning a machine readable code of an incoming load forming at least a portion of an order and comparing the machine readable code with an order file listing objects purported to be on the incoming load, the order file providing information about stored object data for the listed objects;
for each object on the load, capturing object data comprising a 3D image and uniform product code (UPC) of the object removed from the incoming load with an image capture station;
reconciling the captured object data of that object with the order file; and
updating the stored object data to updated object data for use in future receiving, storage, and order fulfillment processes.

18. The method of receiving objects as claimed in claim 17 including adding the updated object data to a database.

19. The method of receiving objects as claimed in claim 18 including controlling the material handling system as a function of the identity of at least one chosen from the objects removed from the incoming load and the objects in the database.

20. The method of receiving objects as claimed in claim 17 including comparing all objects captured with the image capture station with the order file in order to confirm the accuracy of the objects received.

21. The method of receiving objects as claimed in claim 17, wherein said order file comprises an advanced shipping notification.

22. The method of receiving objects as claimed in claim 17, wherein all steps are performed using automated processes, including unloading the object from the load using an automated process.

23. The method of receiving objects as claimed in claim 18 including exchanging data between said database and a public network.

24. A material handling system, comprising:
object handling and transportation devices;
a database that is adapted to store object data comprising three-dimensional (3D) images and UPCs of objects being handled by the object handling and transportation devices;
an image capture station that is adapted to capture 3D images and UPCs of captured objects being handled and transported by the material handling system;
a computer system that is adapted to identify objects by comparing the 3D image and UPC of the object captured with the image capture station with the 3D images and UPCs in the database;
wherein if the captured UPC is common to a UPC of a database object but the 3D image of the captured object is not common to that database object, said computer system adapted to update the object data in the database corresponding to that UPC to include the 3D image of the captured object; and
said computer system controlling devices of the material handling system downstream of the image capture station as a function of the identity of the objects being handled and transported by the material handling system, as identified by said computer, for storage and/or order fulfilment processes for the handled objects.

25. The material handling system of claim 24, further comprising a teaching system configured to capture 3D images of objects with said teaching system and to construct said database with images captured with said teaching system.

26. The material handling system of claim 24, further comprising a pack-out operation comprising an automated palletizer.

27. A material handling system, comprising:
object handling and transportation devices;
a scanner that is adapted to scan a machine readable code of an incoming load, the incoming load forming at least a portion of an order;
a computer system that is adapted to compare the machine readable code scanned with the scanner with an order file listing of objects purported to be on the incoming load, the order file providing information about stored object data for the listed objects; and
an image capture station that is adapted to capture a 3D image and a uniform product code (UPC) of each object removed from the incoming load to obtain actual object data of each object on the incoming load; and
said computer system adapted to reconcile the object data of the captured object with the order file and to update the stored object data to construct updated object data for use in future receiving, storage, and order fulfillment processes.

28. A method of controlling a material handling system comprising object handling and transportation devices, said method comprising:
storing object data for a plurality of database objects in a database, the object data comprising three-dimensional (3D) images of the database objects and, when available, UPCs of the database objects;
capturing a 3D image of a handled object with an image capture station and attempting to capture any UPC of the handled object with the image capture station and including the captured 3D image and any captured UPC with object data for that handled object, the handled object being handled and transported by a transportation device of the material handling system;
identifying the handled object by comparing the 3D image of the handled object captured with the image capture station with the 3D images of database objects in the database and, if captured, comparing the captured UPC of that handled object with a UPC in the object data of the database;
wherein if the captured UPC is common to one or more database object and the captured 3D image of the handled object does not match any object data of the database object having the common UPC, updating the database to include the captured 3D image data of the handled object with the object data corresponding to the common UPC; and controlling devices of the material handling system downstream of the image capture station as a function of the identity of the handled objects being handled and transported by the material handling system for storage and/or order fulfilment processes for the handled objects.

\* \* \* \* \*